United States Patent [19]

Bauck et al.

[11] 4,189,759
[45] Feb. 19, 1980

[54] CANTILEVERED HEAD SUPPORT ARM HAVING INCREASED RESONANCE FREQUENCY

[75] Inventors: Randall C. Bauck, Longmont; Raymond E. Kellow, Sr.; Richard E. Norwood, both of Boulder; Donald W. Schaefer, Lakewood, all of Colo.

[73] Assignee: International Business Machines Corporation, Armonk, N.Y.

[21] Appl. No.: 908,494

[22] Filed: May 22, 1978

[51] Int. Cl.² ..................... G11B 5/48; G11B 21/00
[52] U.S. Cl. .................................. 360/104; 360/128; 360/137
[58] Field of Search ....................... 360/104–106, 360/102, 103, 97–99, 86, 122, 120–130, 135, 137

[56] References Cited

U.S. PATENT DOCUMENTS

| | | | |
|---|---|---|---|
| 3,931,641 | 1/1976 | Watrous | 360/104 |
| 3,984,872 | 10/1976 | Beecroft | 360/105 |
| 3,994,018 | 11/1976 | Kihara et al. | 360/105 |
| 4,091,428 | 5/1978 | Saito et al. | 360/104 |

FOREIGN PATENT DOCUMENTS 2354506 7/1975 Fed. Rep. of Germany ........... 360/103

OTHER PUBLICATIONS

IBM/TDB vol. 19, No. 5, Oct. 1976, pp. 1859–1860, "Transducer Assembly to Circuit-Board Interconnect" by Burns et al.

*Primary Examiner*—John H. Wolff
*Attorney, Agent, or Firm*—James A. Pershon; Joscelyn G. Cockburn

[57] ABSTRACT

A cantilevered beam assembly with a maximum resonance frequency is adaptable for supporting a transducer for use with a random access flexible disk file. The cantilevered beam assembly includes a first cantilevered member and a second elongated member coupled at one end by a flexible joint to the free end of the first cantilevered member. When used with a flexible disk file system, a magnetic transducer is seated on the second end of the elongated member while said elongated member is restricted to flex in one plane only. A relatively thin, tapered, elongated protective structure having a relatively sharp, elongated leading edge contiguous with a relatively sharp front edge is rigidly connected to the first cantilevered member and surrounds the second elongated member in a plane orthogonal to the plane of flex.

5 Claims, 9 Drawing Figures

CANTILEVERED HEAD SUPPORT ARM HAVING INCREASED RESONANCE FREQUENCY

DESCRIPTION

Cross-Reference to Related Applications

The following co-pending patent applications disclose related subject matter:

(i) Application Ser. No. 908,490, filed May 22, 1978 by Donald W. Schaefer and assigned to the assignee of the present invention, entitled, "Read/Write Arm That Prevents Catastrophic Failure."

(ii) Application Ser. No. 890,880, filed Mar. 27, 1978 by Richard E. Norwood et al and assigned to the assignee of the present invention, entitled, "Linear Actuator."

BACKGROUND OF THE INVENTION

1. Field of the Invention

The present invention relates to random access storage devices and, more particularly, to such devices using flexible magnetic disks with noncontact magnetic heads for reading and/or writing magnetic data on a selected disk. Still, more particularly, the invention is directed to the head arm assembly which supports and positions the magnetic head relative to the oxide surface of the selected disk.

2. Prior Art

The use of a head arm assembly for supporting and positioning a magnetic head so as to access data from a track on a selected disk of a multi-disk rotating mass storage system is well known in the prior art. Conventional mass storage systems consist of a stack of rotating member disks and an accessing apparatus. The stack of disks is usually fixed or clamped at the midpoint to a tubular member. The tubular member and disks are mounted to the rotating shaft of a motor for rotation therewith. The motor is usually mounted to a support frame. At least one reference plate is securely mounted on the motor shaft on the tubular member for rotation with the stack of disks. The reference plate is positioned to be in axial alignment with the accessing apparatus when said apparatus is in an initial or home position.

The accessing apparatus includes a positioning apparatus which may be a voice coil motor, a linear actuator, or a linear motor. The positioning apparatus rides on a member of rail which is parallel to the axis of rotation of the disk file. The positioning apparatus positions the magnetic head axially so as to access any selected disk in the disk file. A radial member or carriage which positions the magnetic head radially so as to access any desired track on the selected disk. The radial member is fitted with a head arm support. The magnetic transducer or head is seated on the head arm support. The direction of travel of the carriage and its attachment (i.e., the head arm support and magnetic head) is orthogonal to the axis of rotation of the disk file. The orientation between the rotating disk file and the associated accessing apparatus may be vertical or horizontal. In order to allow access into the disk pack convention means, for example, vacuum or partitioning blades are used to open the pack between two selected disks. The magnetic head is then inserted in the opening and transduces (i.e., reads and/or writes) data on a selected track on one of the two disks. A more detailed discussion of the aforementioned type of flexible disk storage system is described in U.S. Pat. No. 3,940,794 issued to Donald E. Griffiths et al and assigned to the assignee of the present invention.

In order to improve the accessibility and reliability of conventional random access flexible disk devices, several attempts have been made, in the prior art, to improve the head arm support or the mechanism which splits and partitions the pack.

In one attempt a random access memory with ultra thin rotating flexible magnetic disks is stabilized while being partitioned by an air foil blade. The air foil blade is a hollow structure with a contour of varying cross-sectional areas extending from the tip which is first inserted into a pack to the opposite end which is mounted to a carriage assembly. Due to the varying contour of the blade, it operates as an air foil. By thrusting the blade into the rotating disks at a selected interface, the disks are separated into discretely rotating segments which diverge and converge about the blade to form a sizeable opening suitable for transducing access. Pressurized air which is emitted from the air foil blade further stabilizes the opening. A more detailed description of the aforementioned blade is given in U.S. Pat. No. 3,852,820.

In still another attempt, the magnetic transducer of a flexible disk file is mounted on an access arm which is blunt on one side edge and sharp on the other side edge and increases in thickness gradually from the sharp edge to the blunt edges where the maximum thickness occurs. A magnetic transducer is positioned adjacent the blunt edge and in from the tip of the access arm. When the arm is inserted into the flexible disk file with the disk rotating in a direction to transverse the access arm from the sharp edge towards the blunt edge, the transducing interface between the transducer and the rotating disk is relatively close. Stated another way, the disk file is relatively close to the transducer. A more detailed discussion of the aforementioned blade is given in U.S. Pat. No. 3,975,769.

Although the above-described devices have improved accessibility to flexible disk files, these devices do not address the fail-safe aspect of a random access flexible disk storage system. Failsafe, as used herein, means that if an unusual condition or problem is generated during system operation then the splitting mechanism or the head arm support will operate so as to minimize damage to the disk and/or data loss. There are several problem conditions which can develop during system operation which will result in damage to disk storage systems. Probably one common problem condition is power loss. The power loss condition is particularly devastating when the head is in the disk pack simultaneously with the power loss. As is well known to those skilled in the art, the opening in a flexible disk pack which allows a magnetic transducer to enter so as to transduce data from a selected track on a target disk, is generated and controlled by the rotational speed of the pack and/or air jets from an air supply source. Generally the air jets which may be internal to the pack, are used for splitting the pack. When a flexible disk pack is rotating at its normal operational velocity, the surface of a target disk which interfaces the opening is relatively flat (that is free from waves and undulations). However, as the disk pack slows down, bow waves are generated in the surface of the target disk. The bow waves have the potential to interact with the head arm support and/or the transducer. Due to the fact that the disks are fragile, the interaction results in the head and/or head support arm tearing the disk.

In the situation where air pressure is lost, the pack will close on the head and head arm support. This condition also results in damage to the disk pack and loss of recorded information.

Another condition which results in damage to the disks occurs when the head arm support and transducer remain in a closed pack for a relatively long period of time. Under normal operating conditions the media or disk is flying relative to the head and head arm support. However, as the pack closes the head and head arm support are in physical contact with the surface of the disk. This condition generates heat and wear which damage the disk.

Another source of damage to a disk pack occurs when the head arm support and head are inserted into a closed pack or partially opened pack. Generally, the insertion and withdrawal of the head arm support is done by a positioning mechanism. The positioning mechanism is controlled by a servo loop. Controlled signals are generated which instruct the mechanism as to when to insert the head arm support. It is not unusual to have a control signal issued to the mechanism when in fact the disk pack is not opened. The force with which the head arm impacts the disks in the pack results in tearing the disk.

Another type of problem which plagues the prior art head arm support mechanism is that of resonance. This problem is particularly associated with long stroke actuators positioning relatively long head arm support mechanisms. "Long stroke" as it is used herein, means an actuator in which the maximum effective length over which the carriage assembly is moved is greater than two inches. Likewise, a relatively long head arm support means a head arm having a length not less than two inches. The problem is further augmented when the long stroke actuator is used with a high performance, flexible disk storage system. As is well known to one skilled in the art, the rotational speed of the disk coupled with the space on the disk reserved for servo information, dictates the data throughput for the flexible disk file storage system. In order to maintain a relatively high data throughput, the actuator has to move the head arm at a relatively high speed so as to access data from a selected disk in the file. The rapid to and fro motion coupled with the long stroke and the long support arm tends to aggravate the resonance problem.

As the arm resonates, the resonance is transferred to the transducer which it supports. This results in head bounce and roll in the transducer. Head bounce causes variation in the signal recorded on the selected disk or the signal outputted from the transducer. If the output signal is analog, the amplitude of the signal is generally affected. When the output signal is digital, the phase of the signal is affected. Changes in the signal, be they in the amplitude or in the phase, affect the triggering level of the electrical circuits which process the signal. Generally, the electrical circuits needed to process varying signals are more costly and more complicated.

The resonance phenomenon further introduces instability in the servo loop which controls the head arm support. As is well known to those skilled in the art, the servo loop allows the transducer to faithfully follow a selected track on a target disk in the disk storage system. Instability results in servo error which reduces system throughput. It has been observed that whenever the head support arm resonates at a frequency sufficiently close to the cross-over point where the gain of the servo loop is unity, the instability and its associated effect is mostly predominant.

SUMMARY OF THE INVENTION

The above-enumerated defects of the prior art are eliminated by a head mount assembly having a guard portion and cantilevered beam assembly. Due to material selection and geometric proportions, the resonance frequency of the cantilevered beam assembly is further maximized.

The cantilevered beam assembly includes a first member which may be elongated with one end adaptable for mounting to a support member. The free end of the first member is interconnected to one end of an elongated second member by a flexible hinge so that the first and second members form a linear, continuous cantilevered beam. When the distance between the support member and the flexible hinge (measured in a direction parallel to the continuous cantilevered beam) is approximately twenty percent of the total length of the continuous cantilevered beam, the resonance frequency of said beam is maximized.

In one embodiment of the invention, the resonance frequency of the assembly is further improved when the first and second members are fabricated from dissimilar materials. Generally, this improvement is achieved when the first member is fabricated from a material having a high modulus of elasticity and the second member is fabricated from a material with relatively low density, particularly if the first member is fabricated from aluminum and the second member is fabricated from magnesium.

In another embodiment of the invention, the resonance frequency of the assembly is still further improved when the first and second members are fabricated with different thickness; particularly when the thickness of the first member is greater than the thickness of the second member.

Also, by placing a tapered profile on the first member, or on the second member or on both, the first and the second members improve the resonance frequency of said assembly.

In one application, the cantilevered structure is used to support a magnetic transducer which reads and writes data on a target disk of a flexible disk file. In this application, a magnetic transducer is mounted to the free end of the second elongated member and restricted to translational motion in one plane.

In one embodiment, a relatively thin, elongated protective shield having a closed end and an open end is positioned with the open end fixedly mounted to the first member to surround the cantilevered structure. The protective shield is tapered at a predetermined angle $\theta$ relative to a radial line along which the assembly has translational motion. The shield is further characterized by an elongated, relatively sharp leading edge, which is the edge placed perpendicular to the direction of motion of the disk and a relatively sharp front edge, which is the edge of the shield that first enters the stack of disks. The leading edge and the front edge are positioned in an adjacent continuous relationship on the periphery of the protective member.

In another feature of the invention, the free end of the cantilevered, transducer support structure is interconnected to the closed end of the protective shield by an interconnecting means. The interconnecting means limits the flexing motion of the cantilevered transducer support in a plane perpendicular to the translational motion plane.

In still another feature of the invention, channels are fabricated in the cantilevered head support structure. The channels are used for reducing the mass of the articulated head arm and for housing electrical conductors carrying electrical signals to and from the magnetic transducer.

Still another feature of the invention, a laminated spring assembly, is mounted so that one end is securely attached to the hinged end of the second elongated member and the other end is in frictional contact with the first member.

In yet another embodiment of the invention, a ramp-shaped cam surface is fabricated on the bottom surface of the cantilevered transducer support structure. A cam follower rides on the cam surface and controls the landing of the transducer relative to the recording surface of a target disk.

The foregoing and other features and advantages of the invention will be apparent from the following more particular description of preferred embodiments of the invention as illustrated in the accompanying drawings.

DESCRIPTION OF THE INVENTION

Figure 1:
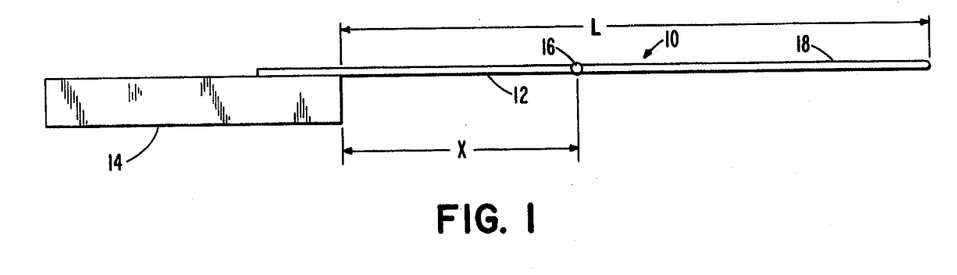
FIG. 1 shows a graphical representation of the cantilevered structure with maximized resonance frequency. The representation is helpful in understanding the geometrical interrelationship of the cantilevered structure.

Referring now to FIG. 1, articulated beam assembly 10 is shown. The articulated beam assembly is comprised of a first cantilevered section 12 which is rigidly mounted at one end to a support means 14. The free end of the first cantilevered section 12 is interconnected via a flexible hinge means 16 to one end of a second cantilevered section 18.

The frequency at which a cantilevered structure such as 10 will vibrate depends on $1/L^2$ where L is the overall length of the cantilevered structure. It was observed that by making the distance x proportional to the overall length L, the resonance frequency of the beam assembly is maximized. In the preferred embodiment, the distance x is about twenty percent of the total length L. It is believed that the reason for the increase is that as x increases from 0, at the fixed assembly 14, the natural frequency of the right half of the assembly increases due to the shortening of its length. The natural frequency of the left cantilevered half decreases as x increases. Obviously, there is some optimum x at which the two resonant frequencies of the right portion and the left portion are equal and at this optimum point, the resulting combined resonance of the assembly 10 is higher in frequency than a cantilevered structure of L alone.

Although the articulated beam assembly described above may be used in any environment where a cantilevered structure with maximized resonance frequency is needed, the articulated beam assembly lends itself for supporting a magnetic transducer in a flexible disk file storage system. This being the case, the above-described articulated beam assembly will be described in a flexible disk file environment. However, this application should not be construed as a limitation on the scope of the above articulated beam assembly since it is within the skill of the art to apply the assembly to other environments where the use of a cantilevered beam with maximized resonance frequency is needed without departing from the scope of the invention.

Figure 2:
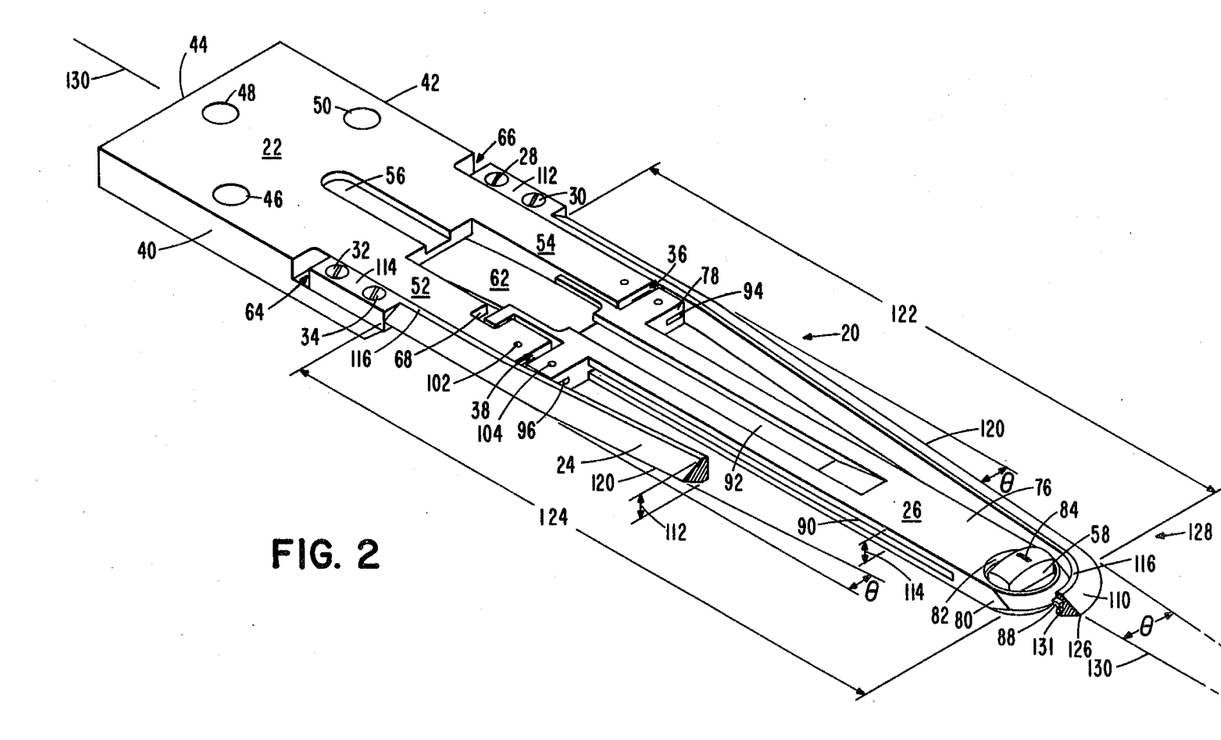
FIG. 2 shows a pictorial, isometric view of the bottom surface of the cantilevered structure supporting a magnetic transducer with a protective shield attached thereto.
Figure 3:
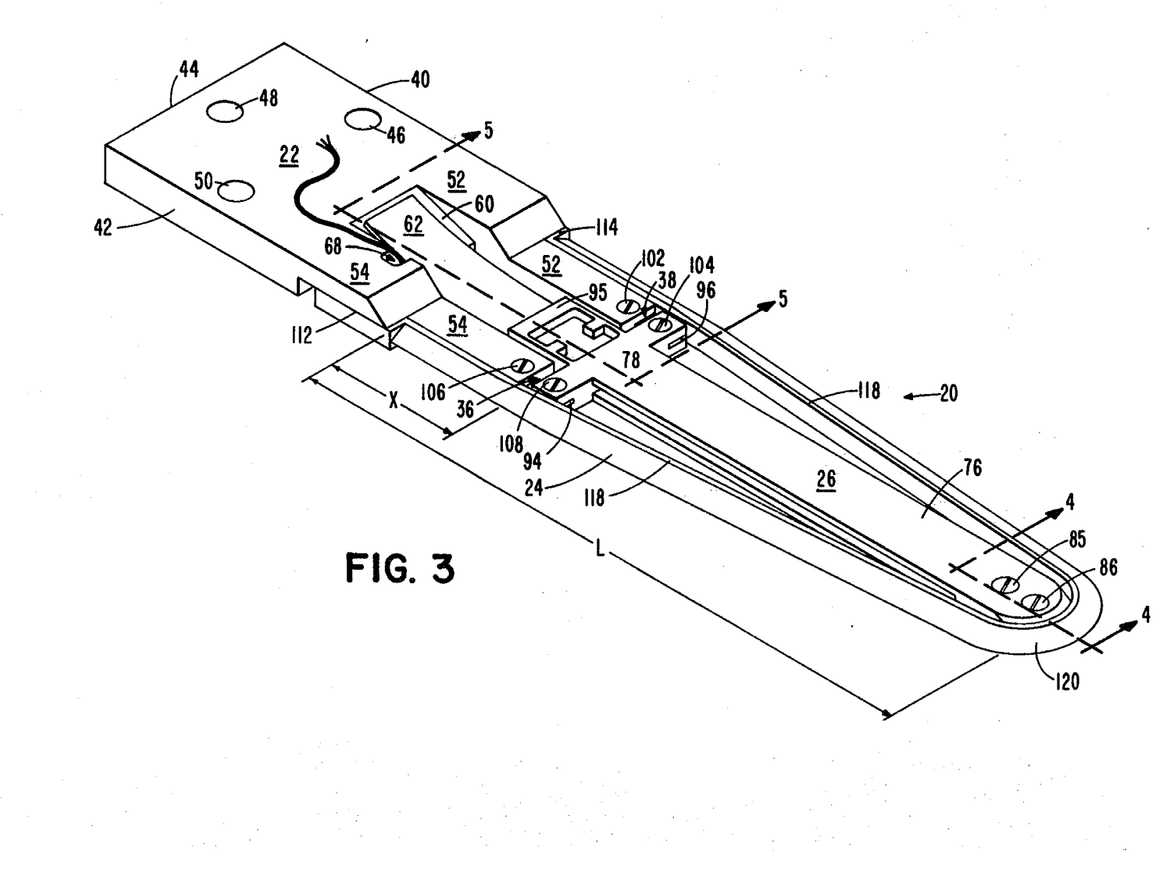
FIG. 3 shows an isometric, pictorial view of the top surface of the cantilevered head support assembly of FIG. 2.

Referring now to FIGS. 2 and 3, a support arm assembly for supporting a magnetic head is shown. The support arm assembly 20 embodies the above-described articulated beam assemblies. FIG. 2 shows a pictorial, isometric view of the bottom surface of the support arm assembly while FIG. 3 shows a pictorial, isometric view of the top surface of the support arm assembly. As is used in this application and as will be explained subsequently, "bottom surface" means the surface of the support arm assembly which interfaces with a target disk during data transducing. Likewise, "top surface" as is used herein, means the surface of the support arm assembly which is away from the surface of the target disk during data transducing. This means that the "top surface" is opposite the "bottom surface." In order to simplify the description of the arm assembly, common elements will be identified by the same numeral.

Still referring to FIGS. 2 and 3, the support arm assembly, hereinafter called the articulated head arm assembly 20, is comprised of base portion 22, guard portion 24, and tip portion 26. When the guard portion is fastened to the base portion by mounting means 28, 30, 32 and 34, respectively, and the tip portion is interconnected to the base portion via flexure means 36 and 38, respectively, the resulting structure defines an articulated head arm assembly for a magnetic head which has maximized resonance frequency. Additionally, the combination defines a fail-safe arm assembly for the magnetic transducer. "Fail-safe" as used herein, means that if the arm assembly is used for supporting a magnetic transducer in a flexible disk storage system and if, due to malfunction in the system, the pack attempts to close while the head is in the pack or alternatively the head tries to access a closed pack, damage to the pack is minimized. Each of the aforementioned, base portion, guard portion, and top portion, is described hereinafter.

1. The Base Portion

Figure 5:
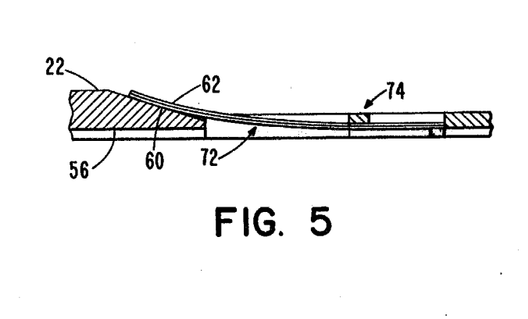
FIG. 5 shows a cross-section taken along line 5—5 of the head support assembly of FIG. 3.

The base portion of the articulated head arm assembly is fabricated from a substantially elongated rectangular member. The rectangular member is comprised of sides 40, 42 and 44 which meet or intersect orthogonally to define a mounting end. A plurality of mounting means, for example screws (not shown), are placed into mounting holes 46, 48 and 50, respectively, to mount the base portion and its related section to the carriage of a linear actuator or linear motor. The free end of the elongated, rectangular member, that is, the end opposite the mounting end, is bifurcated. Stated another way, the free end of the base portion is machined so that an opening is in the central portion defining two legs 52 and 54, respectively. A channel 56 is positioned on the under side of base portion 22. The ramp channel is positioned in the center of the base portion, extending from the edge of the recessed portion toward the mounting end of said base portion. As will be explained subsequently, a cam follower 93 which is mounted to the frame of the linear actuator (see FIG. 7) rides along the channel 56 to gradually load transducer 58 into transducing relationship with the magnetic surface of a target disk in a flexible disk file storage system. Positioned on the top surface of the base portion and extending from the opening toward the mounting end is ramp surface 60 (FIGS. 3 and 5). As will be explained subsequently, laminated spring 62 is fixedly attached to one end of tip portion 26 of the articulated head arm assembly with the opposite end of the spring frictionally contacting the ramp surface of base portion 24. As a result of the frictional engagement of the laminated spring against the cam surface, the magnetic transducer is properly loaded against the transducing surface of the target disk. By using a laminated spring, the damping characteristics of the articulated head arm assembly are improved. Channels 64 and 66, respectively, (FIG. 2) are fabricated on the periphery of legs 52 and 54 of the base portion. As was explained before, fastening means 32, 34, 28 and 30 interconnect the guard portion of the articulated head arm assembly with the base portion.

In an alternative embodiment of the invention, the guard portion and the base portion of the articulated head arm are fabricated as a single member. Stated another way, the guard portion and the base portion are fabricated as a single structure. Preferably, the base portion and the guard portion are fabricated from a die casting.

Notch 68 is fabricated on one of the legs of the base portion. Finger member 70 is fabricated on the tip portion of the assembly. The finger portion cooperates with the notch to limit the penetration of the head into the media. Stated another way, the notch and the finger cooperate to limit the movement of the tip portion in a plane perpendicular to the line of translational motion of said assembly.

Referring to FIG. 5 for the moment, a cross-section taken across line 5—5 (FIG. 3) is shown. This cross-section is helpful in showing the interconnection between the base portion and the tip portion of the articulated head arm assembly. As is evident from the drawing, channel 56 is fabricated on the under side of base portion 22. Ramp surface 60 is fabricated on the top surface of base portion 22. Both the ramp surface and the channel extend from opening 72 toward the mounting end of base portion 22. One of the ends of laminated spring 62 is fixedly mounted to one end of tip portion 26 via receptacle 74 while the free end of the spring is frictionally attached to the ramp surface of the base portion. This completes the detailed discussion of the base portion.

2. The Tip Portion

Having discussed the base portion of the articulated head arm assembly, the tip portion of the assembly will now be described. As was previously described, the tip portion of the articulated arm assembly is hinged to the free end of the base portion via flexure means 36 and 38, respectively (FIGS. 2 and 3). The tip portion of the assembly is substantially a cross-shaped structure. The cross-shaped structure is comprised of upright beam 76 and traverse beam 78. Both the upright beam and the traverse beam intersect orthogonally. The upright beam is substantially rectangular in shape with parallel sides running along its length and parallel to the direction in which the articulated arm assembly is transported to access a selected track on a target disk. The front end 80 of the upright beam is bevelled or tapered into a relatively sharp edge. A hole 82 is fabricated on the under side of the upright member and in from the tapered edge. Magnetic transducer 58 with transducing gap 84 is mounted in the hole by mounting means 85 and 86, respectively (FIG. 3). Of course, it is within the skill of the art to use other means to mount the transducer to the free end of the upright member without departing from the scope of this invention. For example, the transducer can be mounted by using an adhesive to attach said transducer to the upright member. Also, in the preferred embodiment of the invention, fastening means 85 and 86 are screws. Projection 88 is fabricated on the front end of the upright member. As will be explained subsequently, the projection cooperates with a notch 131 which is fabricated in the guard portion of the assembly. The notch and projection 88 cooperate to keep the tip portion of the assembly in the protective shield as the assembly is transported to access data on a target disk. Projection 88 also cooperates with its associated notch to limit the travel of the head into the surface of the selected disk. Channel 90 is fabricated on the side of the tip. The channel is used for threading the conductor which carries electrical signals to and from transducer 58. A similar channel suitable for threading conductors is fabricated on the opposite side of the tip portion. By fabricating the channels in the tip portion of the articulated head arm, the mass of said tip is reduced. Ramp channel 92 is fabricated on the under surface of the upright member. The ramp channel is so positioned that when the assembly is assembled, the channel is in linear but spaced apart alignment with channel 56 which is positioned in the base portion of the assembly. As was stated previously, cam follower 93 (FIG. 7) rides against ramp channel 92 and channel 56, respectively, to control the landing of transducer 58 against the magnetized surface of a selected disk. The back end 95 of the upright member is fabricated with a receptacle opening which receives one end of laminated spring 62. The end of the laminated spring which is attached into the receptacle is held firmly while the other end is frictionally engaged with ramp surface 60 of the base portion. As was described previously, the laminated spring cooperates with the base portion and the tip portion to load transducer 58 against a selected target disk. Also, the laminated spring improves the damping characteristics of the articulated head arm assembly.

Although it is within the skill of the art to devise a plurality of means for securing the laminated spring to the upright member in the preferred embodiment of this invention, a pair of notches is fabricated one on each of the long side of the laminated spring and in proximity of the end which is attached to the receptacle (FIG. 3).

The notches coact with the receptacle to hold the spring firmly.

Figure 6:
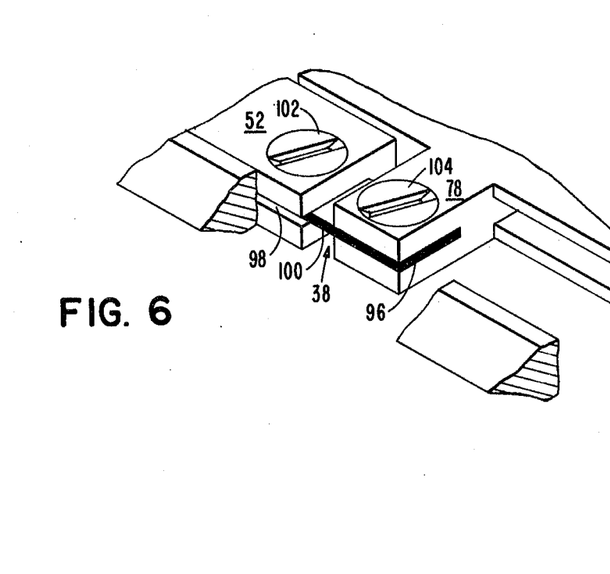
FIG. 6 shows an exploded view of the flexible interconnecting hinge.

The traverse beam 78 which forms part of the tip portion of the assembly is fabricated with openings 94 and 96, respectively. The openings are positioned on the extreme ends of the traverse member. The traverse member is in linear but spaced alignment with legs 52 and 54 of the base portion. A pair of openings similar to openings 96 and 94 (FIGS. 2 and 3), only one of which is shown in FIG. 6 and identified as opening 98, is fabricated in legs 52 and 54, respectively. The openings in legs 52 and 54 are so positioned to be in linear spaced alignment with openings 94 and 96, respectively. As was stated previously, the tip portion of the assembly is interconnected with the base portion by flexure means 38 and 36, respectively. Since flexure means 36 and 38 are identical, only the detail of flexure means 38 is shown in FIG. 6 and will be described hereinafter.

Turning now to FIG. 6 for the moment, interconnecting means 100 is placed into openings 98 and 96, respectively. In the preferred embodiment of the invention, the interconnecting means 100 is a leaf spring which is held firmly in openings 98 and 96 by fastening means 102 and 104, respectively. In the preferred embodiment of this invention, the fastening means are screws. Likewise, a second spring (not shown) is slid into opening 94 and the opening position on leg 54 of the base portion. Screw means 106 and 108 are used to hold the end of the spring firmly to define flexure means 36 which interconnects the tip portion of the assembly with the base portion.

By torquing screws 102, 104, 106 and 108, respectively, the base portion of the articulated arm assembly is now interconnected with the tip portion of the assembly to form an elongated, cantilevered structure. When the base portion is fixedly connected to the carriage assembly of a linear actuator or motor by mounting means 46, 48 and 50, respectively, and transducer 58 is mounted to the free end of the cantilevered structure, the resulting support assembly demonstrates a substantially high resonance frequency. It is further noted that when the distance L measured from the fixed end of the base portion to the front end of the tip is five times the distance x (where x is the distance measured from the fixed end of the base portion to the free end), then the frequency at which the cantilevered assembly (base portion and tip portion) resonates is improved (i.e., increased).

It was further noted that by using dissimilar materials for fabricating the base portion and the tip portion of the assembly, the resonance frequency was further improved (i.e., further increased). In the preferred embodiment of this invention, the base is fabricated from a material having a high modulus of elasticity, for example, aluminum, and the tip is fabricated from a low density (i.e., light) material, for example, magnesium.

3. The Guard Portion

Having described the base and the tip portions of the articulated arm assembly, the guard portion will now be described. Still referring to FIGS. 2, 3 and 4, guard portion 24 of the articulated arm assembly is fixedly mounted at its open end by mounting means 32, 34, 28 and 30, respectively. The guard portion is relatively flat and extends in a plane parallel with the upright member of the tip portion. The guard member surrounds or enshrouds the tip portion of the assembly in the plane of motion of said assembly. As is used herein, "plane of motion" means the direction in which the articulated arm assembly is transported by the movable carriage of a linear actuator or linear motor. Generally, the articulated arm assembly is transported in a direction radially to a target disk in a flexible file magnetic storage system. The guard section of the articulated arm assembly creates a fail-safe feature for the articulated arm assembly. This means that throughout the period when transducer 58 is accessing data on a target disk of a flexible disk file system, if the pack closes due to inadvertent error or for whatever reason, the guard portion of the articulated head arm will tend to force the arm assembly and transducer 58 out of the pack with a minimum amount of damage to said pack. Conversely, should the head arm assembly attempt to access a closed pack, the guard portion will attempt to open the pack so as to minimize damage to the disk.

Additionally, the guard portion provides protection to the disk pack and head arm support while in the pack. The guard portion causes the disks to be deflected around the tip portion, thereby preventing the disk from catching onto the edges of the transducer and tip portion. By using the guard, the edges of the transducer and the guard may be sharp.

The guard portion 24 of the articulated head arm assembly includes a substantially flat, elongated, ring-like member. The ringlike member includes an open end adapted for mounting to channels 66 and 64, respectively, of the base portion and a closed end 110 extending in a cantilevered manner from the open mounting end of the ring-shaped member. The elongated ringlike member is further characterized by rectangular portions 112 and 114, respectively. Each of the rectangular portions is positioned to join the open end of the elongated ringlike member and extends in a direction toward the closed end. The profile of the elongated guard portion is further characterized by a relatively flat inner surface 111. The inner surface 111 is positioned about the inner periphery of the elongated member and faces the upright member of the cross-shaped tip portion. The dimension 112 of the inner surface is substantially equivalent to the dimension 114 of the upright member of the cross-shaped tip portion. With this relationship, the tip portion which supports transducer 58 is completely surrounded by the shroud member in the plane of motion. A relatively narrow, flat surface 116 is positioned on the bottom surface of the guard portion. The surface is contiguous with the top surface of the rectangular members and extends from the inner edge of the guard portion toward the outside edge. Likewise, a relatively flat, narrow top surface 118 is fabricated on the top surface of the guard portion. In like manner, the surface 118 extends from the inner edge of the guard portion toward the outer edge and is contiguous with the top surface of rectangular portions 114 and 112, respectively. Beginning from the outer edge of surfaces 116 and 118, respectively (FIGS. 2 and 3), the guard portion tapers into a relatively sharp edge 120. Edge 120 is contiguous about the outside periphery of the guard portion beginning from the rectangular portion and extending towards the front edge. The contiguous edge is comprised of leading edge 122, trailing edge 124, and front edge 126. The leading edge, the front edge, and the trailing edge are contiguous and adjacent to one another. As is used herein, "leading edge" is defined in terms of the articulated arm assembly relative to a rotating disk file. As such, assume that the articulated arm assembly is positioned relative to a rotating disk file storage system. Further assume that the carriage of the linear actuator transports the articulated arm assembly along a line extending from the center of rotation of the disk file parallel to the lengthwise dimension of the articulated head arm. Assuming that the disk is rotating in a counterclockwise direction as shown by arrow 128, then the leading edge 122 is that edge at which a point that is rotating on the disk would first encounter edge 122. Likewise, the trailing edge 124 is that edge which the rotating point would encounter after edge 122. The front edge 126 is that edge which points toward the center of rotation of the rotating disk file. By positioning the relatively sharp leading edge 122, front edge 126, and trailing edge 124 to be contiguous and surrounding the outside periphery of the guard portion, if the articulated arm assembly attempts to access a closed disk pack, the edge generates an opening in the pack without catastrophically damaging the disk in said pack.

Another characteristic of the guard portion of the articulated head arm is that should the flexible disk pack, for any reason, close while the head is within the pack, the articulated arm assembly will be ejected from said pack. The ejection characteristic is obtained by fabricating the guard member with a tapered or sloping profile extending at a predetermined angle theta ($\theta$) with respect to a horizontal line. Stated another way, the predetermined angle theta may be defined as the angle formed between action line 130 and the sloping, leading edge of the guard portion. The angle theta precedes the front edge of the guard portion of the articulated arm as the articulated head arm assembly enters a disk file. The action line 130 is defined as an imaginary line running along the length of the articulated arm, along which said arm is transported, and passes through the center of rotation of the flexible disk file against which the articulated head arm is aligned for positioning a transducer relative to a disk pack in said file. It has been determined that the larger the value of the theta, the more effective is the ejecting force. An opening 131 is fabricated in inner surface 112. As was explained previously, projection 88 cooperates with opening 131 to limit the extent to which the transducer means 58 penetrates the surface of a target disk. It further helps to keep the head portion of the articulated arm assembly in alignment with the guard portion of the assembly. Although it is within the skill of the art to select various dimensions for the critical profile of the guard portion of the articulated arm assembly, in the preferred embodiment of the invention, a theta ($\theta$) was chosen to be substantially equivalent to 5°. The distance measured from edge 120 to inner surface 111 of the guard member is approximately equivalent to 0.190 inches, and the distance measured between surface 116 (FIG. 2) and 118 (FIG. 3), respectively, along the inner surface 111 is substantially equivalent to 0.095 inches.

Although in the above description the guard member is fastened to the base portion of the assembly, in one embodiment, the base and the guard portions were fabricated as a single contiguous member with the guard member having the characteristics described above.

Figure 4:
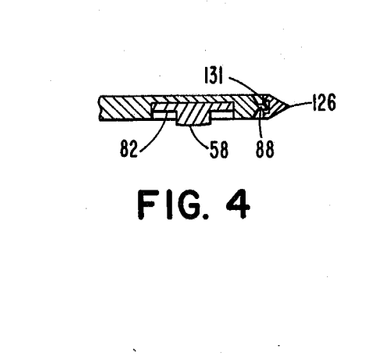
FIG. 4 shows a cross-section taken along line 4—4 of the free end of the cantilevered structure of FIG. 3.

Referring now to FIG. 4, a cross-section taken across line 4—4 (FIG. 3 is shown), as is evident from this cross-section, transducer 58 is seated in hole 82 while projection 88 coacts with hole 131 to keep the tip portion fixed within the guard member.

Figure 7:
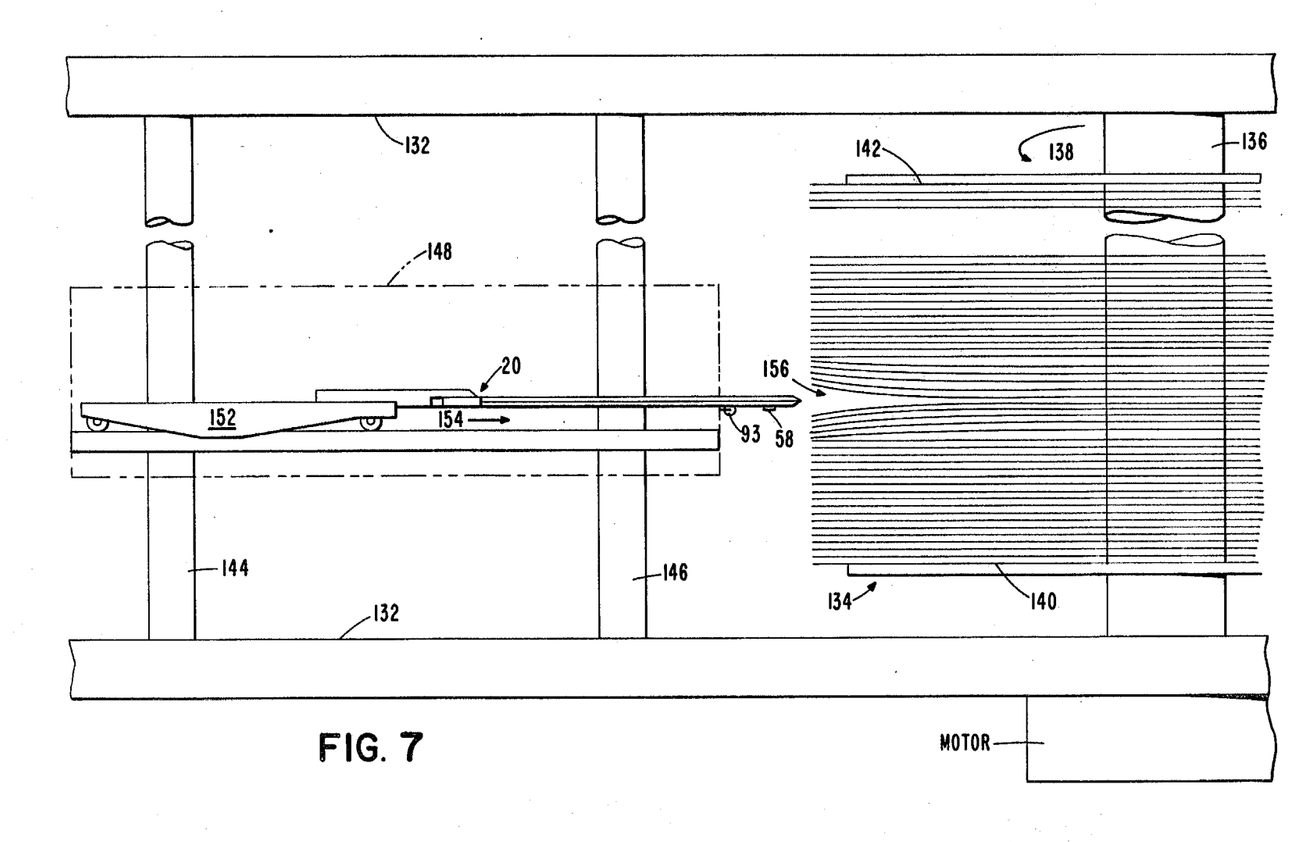
FIG. 7 is a simplified, diagrammatic front elevational view of a flexible disk storage system employing the head arm assembly of the present invention.

Referring now to FIG. 7, a front elevational view of a flexible disk magnetic storage system is shown. The magnetic storage system is comprised of a support frame 132. A flexible disk file 134 is mounted to the frame. The disk file includes spindle 136 which is journaled for rotation to the frame and is driven by a constant speed motor. A plurality of flexible disks having their center of rotation clamped to the spindle 136 is driven in a clockwise direction as shown by arrow 138. End plates 140 and 142, respectively, are positioned on spindle 136 and align the flexible disk in an axial direction. Guide members 144 and 146, respectively, are fixedly mounted to the frame. Linear actuator 148 is mounted to the guide members. The linear actuator is mounted to the guide members so that it is able to move in a direction parallel to arrow 150 along the guide members. Carriage assembly 152 is positioned on the linear actuator so that the coil assembly of the carriage is positioned within the air gap defined by the magnetic structure of the actuator. As is well known to those skilled in the art, the interaction between the magnetic flux generated by the magnetic circuit of the linear actuator and the current passing through the coil creates a force which allows the carriage assembly to move in a direction parallel to arrow 154. As was stated previously, roller 93 is mounted to the frame of linear actuator 148. The articulated head arm assembly 20 is mounted to carriage assembly 152. Particularly, the base portion of the assembly is fixedly mounted to the carriage assembly while transducer 58 is mounted to the free end of the cantilevered structure. The articulated head arm is aligned with opening 156 which is generated between two adjacent flexible disks of disk pack 134. The opening can be generated by conventional means, for example, forced air. Due to the fact that the articulated head arm has motion along the axial direction of the rotating disk file, magnetic data can be transduced (written or read) from a selected track position along the radial dimension of a target disk. Likewise, the fact that the linear actuator has axial motion relative to the axis of rotation of the disk means any disk within the rotating file can be accessed by transducer 58.

Figure 8:
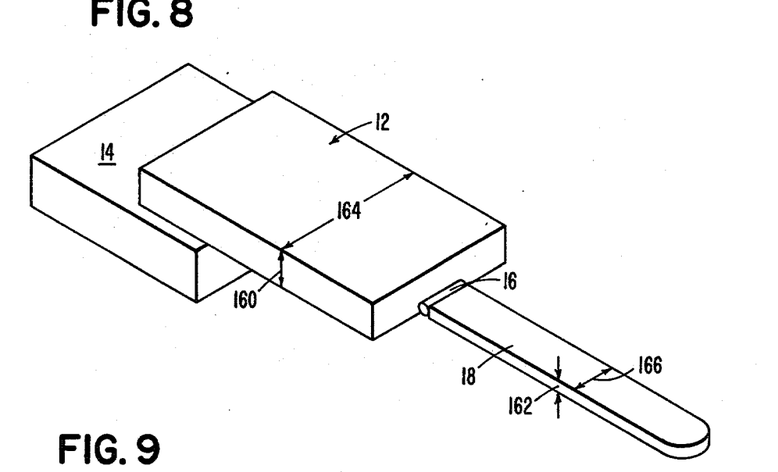
FIG. 8 shows a pictorial schematic of an alternate embodiment of the cantilevered structure. The pictorial schematic demonstrates additional geometric relationship which improves the resonance frequency of the structure.
Figure 9:
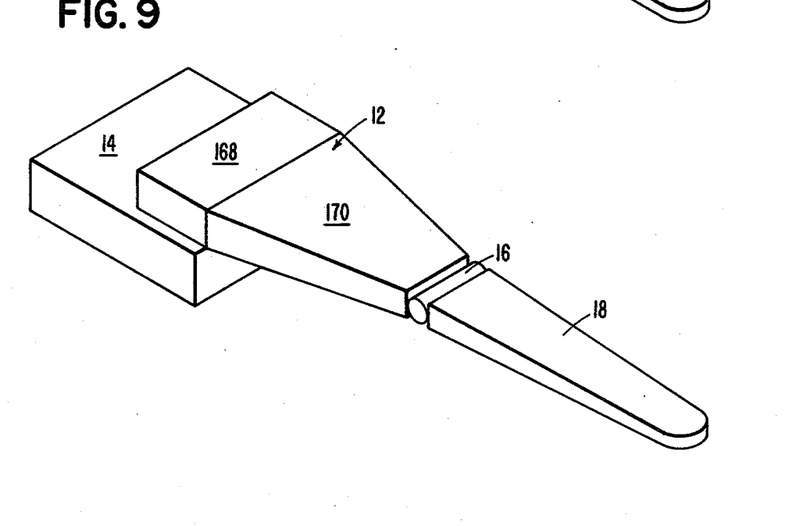
FIG. 9 demonstrates other geometric properties which improve the resonance frequency of the structure.

FIGS. 8 and 9 depict an alternate embodiment of the articulated beam assembly. By fabricating the first cantilevered section 12 and the second cantilevered section 18, in accordance with the geometric properties disclosed hereinafter, the resonance frequency of the articulated beam assembly is further maximized. In each of the figures the first cantilevered section is connected to a support means 14 and the first and second cantilevered sections are interconnected by a flexible means 16. The geometric dimensions such as thickness, width, angle of taper, etc. are not drawn to scale. The dimensions are exaggerated so as to show the important geometric characteristics which are necessary to maximize the resonance frequency of the structure.

In FIG. 8 the thickness 160 of the first cantilevered section is greater than the thickness 162 of the second cantilevered section. Likewise, the width 164 of the first cantilevered member is wider than the width of the width 166 of the second cantilevered member.

Referring now to FIG. 9, the first cantilevered section has a mounting portion 168 and a section 170 which tapers from the mounting section towards the flexure means. Also, the second cantilevered section tapers from flexure means towards the free end. It is worthwhile noting that although specific geometric characteristics, for maximizing the resonance of a cantilevered structure, are discussed above and shown in FIGS. 8 and 9, any modification singly or in combination, which generates a geometric characteristic (for example, a second cantilevered section with a tapered profile [FIG. 9] connected to a substantially rectangular first cantilevered structure [FIG. 1] or visa versa) not specifically described herein but falls within the spirit of the disclosed invention is contemplated to be covered by said invention.

4. Operation

The articulated cantilevered structure described above is suitable for use in any environment wherein a cantilevered beam with maximized resonance frequency is needed. One of such applications is as a head support for a flexible disk file as is shown and described in FIG. 7. In this particular application, the elongated base portion 22 is fixedly mounted to the carriage assembly 152 of a linear actuator. The elongated tip portion 26 is connected to the free end of the base portion by flexure means 38 and 36, respectively (FIGS. 2 and 3). Transducer 58 is then attached to the free end of the tip portion. To further enhance the reliability of the assembly, guard portion 24 is positioned to surround the tip portion in the plane along which the assembly is transported by the carriage assembly with the open end of the guard portion fixedly mounted to the base. The assembly (i.e., base, tip and guard portions) is able to transduce data from a selected disk in a fail-safe mode.

By positioning the flexure means between the free end of the cantilevered assembly and the fixed end, the resonance frequency at which the structure vibrates is maximized.

By using a laminated spring to load the magnetic transducer against the oxide surface of a selected disk, the damping characteristic of the articulated head arm is improved. The effective mass which loads the transducer against the disk is that mass resulting from the tip portion of the articulated head arm assembly. It is well known that the lower the mass which loads the magnetic transducer against a flexible disk, the better the transducer will follow the surface of the disk. Since the mass of the tip is lower than if the tip was hinged at the carriage by the flexing means, the surface following capabilities of a system embodying the teaching disclosed in the articulated head arm are improved.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a flexible random access disk file memory system wherein one or more disks are mounted for rotation about a centrally located axis and a magnetic transducer is mounted to a support arm, said support arm being rigidly mounted to the movable assembly of a linear actuator for movement along a radial line into and out of the disk file memory system, an improved support arm comprising in combination:
   a first elongated relatively flat support means having one end rigidly mounted to the movable assembly and the other end cantilevered therefrom;
   a second elongated relatively flat support means positioned in end to end alignment with the first support means and operable to support the magnetic transducer, the ratio between the length of the first elongated support means and the sum of the length of the first and the second elongated support means is approximately one to five;
   a resilient connecting means operable for joining the first and the second support means, said resilient connecting means being adapted to flex in a first direction orthogonal to the plane of the disks and the first and second support means; and
   a third relatively flat, u-shaped elongated member rigidly mounted to the first support means and encasing the balance of the first and second support means, said third member being substantially in the same plane as the first and second support means and characterized by an elongated, relatively sharp leading edge positioned in contiguous, adjacent relation with a relatively sharp front edge and a predetermined converging angle relative to the radial line along which movement of the head support arm occurs.

2. The device as claimed in claim 1 further including:
   a biasing means operable for loading the transducer relative to the disk surface;
   a first control means operable to gradually land the transducer relative to the disk surface.

3. The device as claimed in claim 2 wherein the biasing means includes a laminated spring.

4. The device as claimed in claim 2 wherein the first control means includes an elongated ramp shaped cam surface positioned in the first and second support means and a cam follower means mounted on said linear actuator and operable to co-act with the ramp shaped cam surface.

5. The device claimed in claim 1 wherein the first support means is fabricated from a first material having a relatively high modulus of elasticity and the second elongated support means is fabricated from a material having relatively low density.

* * * * *